US005746055A

United States Patent [19]

Nakamura et al.

[11] Patent Number: 5,746,055

[45] Date of Patent: *May 5, 1998

[54] HYDRAULIC TILT AND TRIM CONTROL FOR MARINE PROPULSION

[75] Inventors: Daisuke Nakamura; Masahiko Iida, both of Shizuoka-ken, Japan

[73] Assignee: Sanshin Kogyo Kabushiki Kaisha, Hamamatsu, Japan

[ * ] Notice: The term of this patent shall not extend beyond the expiration date of Pat. No. 5,529,519.

[21] Appl. No.: 614,542

[22] Filed: Mar. 13, 1996

[30] Foreign Application Priority Data

Mar. 13, 1995 [JP] Japan .................................... 7-079325

[51] Int. Cl.$^{6}$ ....................................................... F16D 31/02

[52] U.S. Cl. .................................. 60/454; 60/478; 91/43; 91/169; 91/173

[58] Field of Search .............................. 60/454, 464, 465, 60/476; 91/43, 44, 169, 173; 92/52; 440/61

[56] References Cited

U.S. PATENT DOCUMENTS

| | | | |
|---|---|---|---|
| 2,928,243 | 3/1960 | Albright | 60/465 |
| 3,147,829 | 9/1964 | Johnson et al. | 91/43 |
| 3,473,325 | 10/1969 | Vargo | 60/476 |
| 4,773,300 | 9/1988 | Klatt et al. | 92/52 |
| 5,261,843 | 11/1993 | Tsujii et al. | 440/61 |
| 5,529,519 | 6/1996 | Nakamura et al. | 440/61 |

*Primary Examiner*—F. Daniel Lopez

*Attorney, Agent, or Firm*—Knobbe, Martens, Olson & Bear LLP

[57] ABSTRACT

A hydraulic tile and trim mechanism for a marine outboard drive that provides a compact assembly and which ensures that contaminants which may enter the hydraulic fluid can accumulate in the fluid reservoir and will not be circulated by the fluid pump. This is accomplished by positioning the reservoir below the fluid pump and using a pick-up tube that does not extend into the bottom of the reservoir so that the contaminants can accumulate therein without being circulated.

7 Claims, 6 Drawing Sheets

HYDRAULIC TILT AND TRIM CONTROL FOR MARINE PROPULSION

BACKGROUND OF THE INVENTION

This invention relates to a hydraulic tilt mechanism for a marine propulsion unit and more particularly to an improved hydraulic tilt and trim arrangement for such unit.

It is well known in marine propulsion units, be they outboard motors or the outboard drive portion of an inboard-outboard drive, to mount the propulsion unit so that it can be adjusted for vertical height and for trim. These units normally incorporate a hydraulic motor that effects at least the trim and, at times, the tilt operation of the outboard motor. Normally, a reversible electric motor drives a reversible fluid pump that selectively pressurizes or depressurizes the hydraulic motor for effecting these movements. In addition, the hydraulic motor frequently employs a shock absorber arrangement so that, when the propulsion unit strikes an underwater object, it can pop up until the object is cleared so as to protect the unit from damage.

Frequently, the entire hydraulic mechanism is disposed on the transom of the watercraft between the transom and the propulsion device. Obviously, this requires a very compact assembly. Since it necessary to incorporate a hydraulic reservoir for accommodating the fluid for the system when the hydraulic motor is at one end of its stroke, provision must be made for a reservoir of fairly substantial volume.

Frequently, these arrangements are positioned and disposed so that the reservoir is above the hydraulic motor. In addition, in order to maintain small volumes, the pick-up for the fluid pump is disposed at the lower end of the reservoir. Although this type of construction can permit compact assembly and positioning within the requisite space, there is a problem with such arrangements.

As noted, the hydraulic mechanism and, specifically the fluid motor, includes a shock absorbing mechanism which includes shock absorbing valves and orifices. These valves and/or the flow control orifices may be quite small. Thus, if any contaminates enter the hydraulic fluid and can enter into the fluid motor, the passages or valves may be obstructed and performance deteriorated or totally lost.

It is, therefore, a principal object of this invention to provide an improved hydraulic trim control for a marine propulsion unit.

It is a further object of this invention to provide a hydraulic trim and tilt control for a marine propulsion unit wherein the system is compact, but, nevertheless, protected against contaminates interfering with the operation of the hydraulic motor.

SUMMARY OF THE INVENTION

This invention is adapted to be embodied in a hydraulic tilt mechanism for a marine outboard drive comprised of a hydraulic motor having a cylinder that is adapted to be affixed to one of the members of the outboard drive. The cylinder defines a cylinder bore. A piston is reciprocal in the cylinder bore and defines at least one fluid chamber therein. A piston rod is affixed to the piston and extends through one end of the cylinder for connection to another member of the outboard drive for effecting relative trim movement of the members upon pressurization of the fluid chamber. A fluid pump is provided for selectively pressurizing the fluid chamber. A fluid reservoir is provided which contains fluid for the pump. The fluid reservoir is connected to the pump by a delivery conduit that extends into the reservoir, but which terminates at a substantial distance above its lower surface so that foreign contaminants may collect in the reservoir and will not be circulated by the pump.

DETAILED DESCRIPTION OF THE PREFERRED EMBODIMENTS OF THE INVENTION

Figure 1:
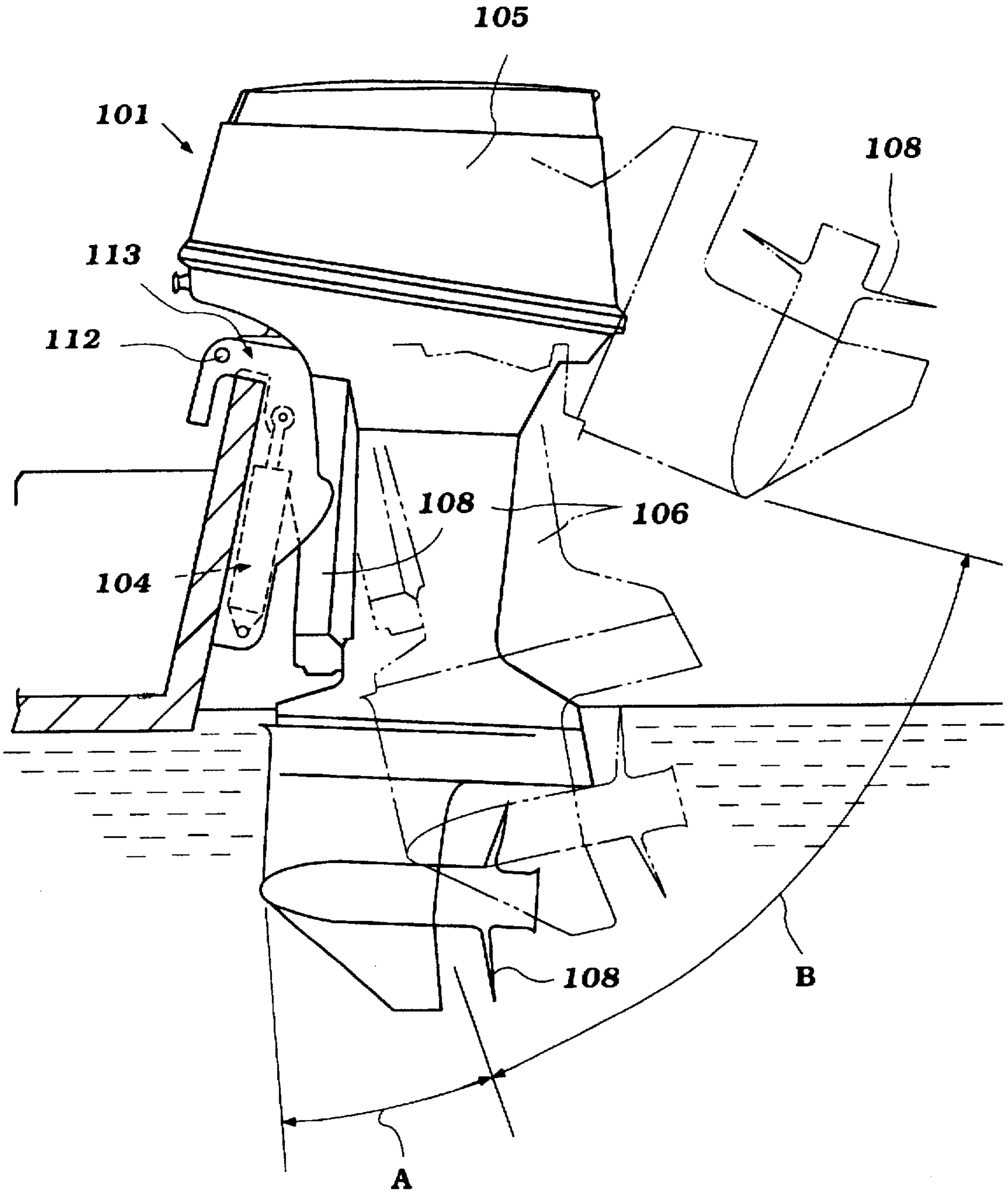
FIG. 1 is a side elevational view of an outboard motor constructed in accordance with an embodiment of the invention as attached to the transom of an associated watercraft, shown partially and in section, and shows the fully trimmed down condition in solid line positions, the fully trimmed up position and the tilted up out-of-the-water position in phantom.

Referring now in detail to FIGS. 1–10, which illustrate a preferred embodiment of the invention, and initially to FIG. 1, an outboard motor constructed in accordance with the preferred embodiment of the invention is identified generally by the reference numeral 101. The outboard motor 101 is shown as attached to a transom 102 of an associated watercraft 103 that is shown partially and in section. The hydraulic tilt and trim device constructed in accordance with this embodiment of the invention is identified generally by the reference numeral 104 and is shown in more detail in FIGS. 2–10. Basically, the attachment of the hydraulic tilt and trim unit 104 to the associated watercraft 103 and its relationship with the outboard motor 101 is the same as the prior art type of devices. This connection will be described briefly below.

Also, although the invention is described in conjunction with the outboard motor 101, it should be readily apparent that the invention is susceptible of use with other types of outboard drives, such as the outboard drive portion of an inboard/outboard drive. However, because of the nature of the invention, it has particular utility with outboard drive units of small and medium size. This does not mean, however, that the facets of the invention cannot be used with larger displacement units and it is believed that that usage will be readily obvious to those skilled in the art.

The outboard motor 101 includes a power head 105 which is comprised of a powering internal combustion engine and a surrounding protective cowling. As is typical with outboard motor practice, the engine of the power head 105 is supported so that its output shaft rotates about a vertically extending axis and drives a drive shaft that is journaled within a drive shaft housing 106. None of the internal components of the outboard motor 101 are being illustrated because it will be obvious to those skilled in the art how the invention can be employed with any conventional type of structure.

The drive shaft which extends through the drive shaft housing 106 extends into a lower unit 107 and there drives a propulsion device such as a propeller 108 through a conventional forward/neutral/reverse transmission.

A steering shaft (not shown) is affixed to the drive shaft housing 106 and is supported for steering movement within a swivel bracket 109 in a known manner. The swivel bracket 109 has a forwardly extending portion 111 that is connected by means of a pivot pin 112 to a clamping bracket 113. The clamping bracket 113 is adapted to be detachably affixed to the transom 102 in a well-known manner.

The pivotal connection 112 between the clamping bracket 113 and the swivel bracket 109 permits the outboard motor 101 to be moved through a trim adjusted range, indicated at A in FIG. 1, wherein the fully trimmed down position is shown in solid lines and the fully trimmed up position is shown in phantom lines. In addition, the outboard motor 101 may be swung through a remaining arc B to a tilted up out-of-the-water position about the pivot pin 112, as also shown in a phantom line view. The hydraulic tilt and trim device 104 operates to effect these movements and other movements, as will become apparent.

Figure 2:
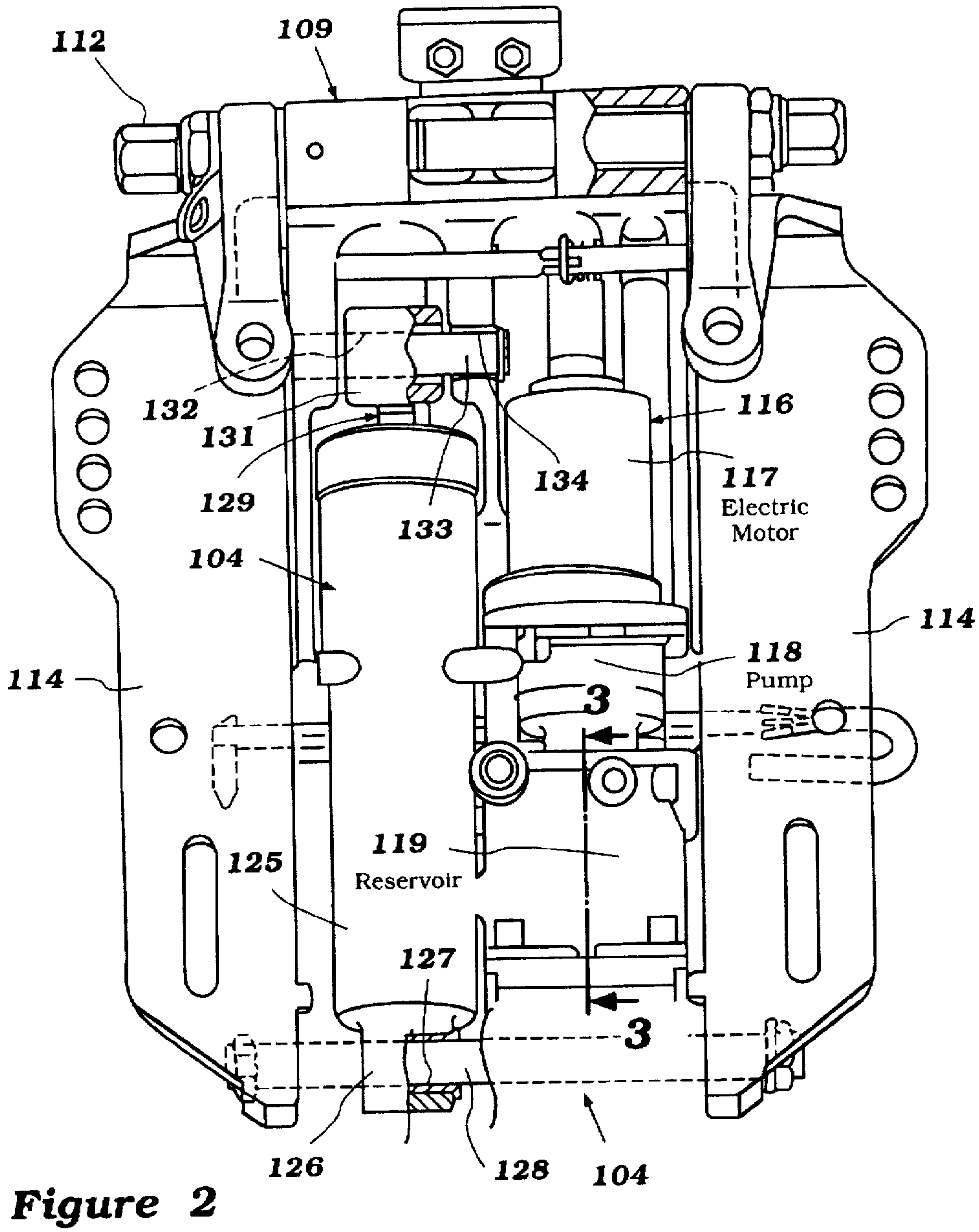
FIG. 2 is an enlarged front elevational view of the hydraulic tilt and trim adjustment mechanism.
Figure 3:
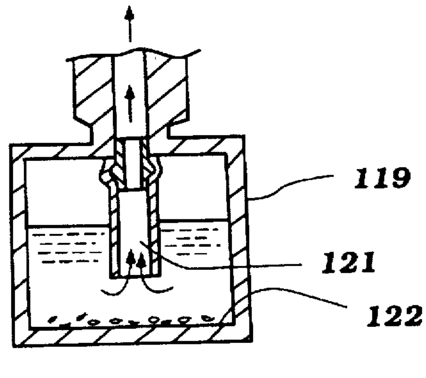
FIG. 3 is a cross sectional view of the fluid reservoir and pick up taken along the line 3—3 of FIG. 2.

The device 104 will now be described by additional reference to FIGS. 2 through 4. It will be seen that the clamping bracket 113 actually comprises a pair of spaced-apart side portions 114 that are mounted on the rear of the transom with the swivel bracket 109 being interposed between them. The hydraulic tilt and trim device 104 is nested between the bracket 114 so as to provide a compact assembly.

The device 104 is comprised of the actual hydraulic motor assembly, indicated generally by the reference numeral 115, which is disposed adjacent to and which forms an integral part with the powering assembly 116 therefor. The powering assembly 116 includes at the upper end a reversible electric motor 117. A reversible hydraulic pump 118 is disposed below the motor 117 and has a rotor which is driven by it. A fluid reservoir 119 is disposed beneath the pump 118 and contains fluid for the system. In addition, a suitable valve assembly may be incorporated within the pump 118 and reservoir 119 so as to provide the normal pressure relief functions and so forth.

In addition, the pump 118 is provided with a pair of outlet ports that communicate with inlet ports formed in the hydraulic tilt and trim device 104. It should be noted that the outer housings of the units 104 and 118 may be common or they may comprise separate pieces that are affixed to each other. However, by having interfitting ports the necessity for providing external conduits is avoided and the construction is more compact.

It should be noted that the reservoir 119 is located below the pump 118 and above the lower end of the fluid motor 115. The pump 118 draws fluid from the reservoir through a pick up tube 121 (FIG. 3) that terminates above the lower wall 122 of the reservoir 119. This insures that any foreign particles trapped in the fluid will settle by gravity to the lower portion of the reservoir. Thus these particles will not enter the fluid motor 115 and interfere with the small passages and valves, to be described, located therein.

Continuing to refer primarily to the external construction, the hydraulic motor 115 includes a cylinder housing 125 having a trunnion portion 126 with a bore 127 so as to receive a pin 128 for providing a pivotal connection to the clamping bracket 113, and specifically to the side plates 114 thereof. In addition, a piston rod 129 has a trunnion 131 with a bore 132. This piston rod bore receives a further pivot pin

133 that provides a pivotal connection to a bore 134 formed in a portion of the swivel bracket 109 so as to interpose the hydraulic unit 115 therebetween for the tilt and trim movement, which will now be described by reference primarily to FIGS. 4–10, so as to permit those skilled in the art to understand the principles of operation and the utility of the overall construction.

The outer cylinder 125 is provided with a bore comprised of three portions, each having a different diameter. These comprise a lower portion 135 which has the smallest diameter and is formed adjacent the blind end of the cylinder 125. Above the bore 135 is an intermediate, larger diameter bore 136. At the upper end of the bore 136 there is provided a further, still larger diameter bore 137 which is closed at its upper end by an end closure and gland assembly 138.

A trim cylinder, indicated generally by the reference numeral 139, is slidably supported within these three bores 135, 136, and 137 and is formed itself with a lower, smaller diameter portion 141 which is contained primarily within the bore 135 but which extends partially in all positions into the bore 136. Above the cylindrical portion 141 there is provided a further portion 142 which has an outer diameter that is complementary to the outer cylinder bore 136 and which is received in this bore and also in the bore 137 in all of its positions.

The upper end of the trim cylinder 139 is provided with a sealing ring portion 143 that is affixed rigidly to it between a shoulder 144 and an end closure, gland assembly 145. The sealing ring 143 has inner and outer grooves that receive a pair of O-rings 146 for sealing the trim cylinder 139 and the outer cylinder 125 so as to define a first upper fluid chamber 147 that is in communication with one of the aforenoted pump ports through an internal passage which terminates adjacent the end closure and gland 138 and which does not appear in the figures.

A position responsive valve, indicated generally by the reference numeral 148, is provided in the end closure and gland 145 for a reason which will be described.

It should be noted that since the trim cylinder 139 provides its fluid seal with the upper outer cylinder bore portion 137, close tolerances can be easily maintained because the bore portion 137 is adjacent the end closed by the gland 138. Also, a large diameter may be used for the bore 137 and sealing ring 143 in the area above the pump 118 and reservoir 119 so as to permit a very compact assembly and one which can be easily nested between the clamping bracket side plate 114. This construction is evident from FIG. 2, wherein it is seen that the electric drive motor 117 has a lesser transverse dimension than the pump housing 118 and reservoir 119. Thus, the advantages of this facet of the construction should be readily apparent to those skilled in the art.

Figure 4:
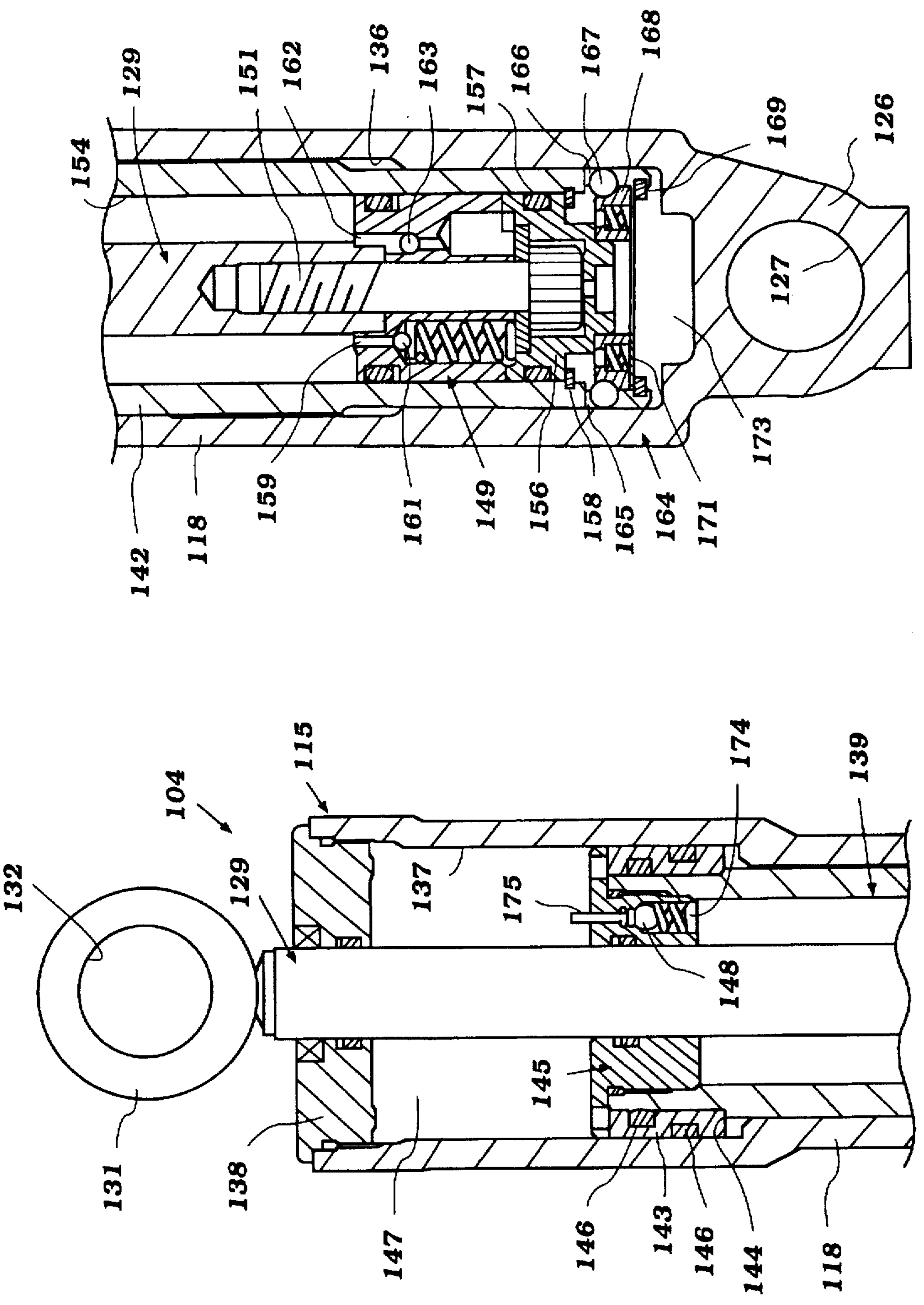
FIG. 4 is a broken cross-sectional view taken through the fluid motor in accordance with a first embodiment of the invention.

Referring now primarily to the right hand side of FIG. 4, a piston, indicated generally by the reference numeral 149, is affixed to the lower end of the piston rod 129 by means including a threaded fastener 151 which is engaged with a retainer plate 152 which, in turn, holds the body of the piston 149 in place. The piston 149 carries a seal 153, which is in sealing engagement with an internal bore 154 of the trim cylinder 139. This thus forms a first fluid chamber 155 between the piston 149 and the end closure and gland 145.

A floating piston 156 is positioned within the trim piston cylinder bore 145 and carries a seal 157 for providing sealing engagement therewith. The floating piston 156 may move axially within the trim cylinder bore 145, but its lowermost position is limited by a snap ring 158 that is received in a groove formed at the lower end of the trim cylinder 139. Hence, the floating piston 156 forms a further fluid chamber between the underside of the piston 149 within the trim cylinder bore 154.

A shock absorber passage 159 extends through the piston 149, and a pressure responsive absorber valve 161 permits restricted flow from the chamber 155 to the chamber formed between the piston 149 and the floating piston 157 so as to permit the outboard motor 101 to pop up when an underwater obstacle is struck. When the underwater obstacle is cleared, the outboard motor 101 may again return to its trim adjusted position by fluid flow from the area between the piston 149 and the floating piston 156 through a let-down passage 162 formed in the piston 149. The flow through passage 162 is controlled by a light absorber check valve 163.

Figure 10:
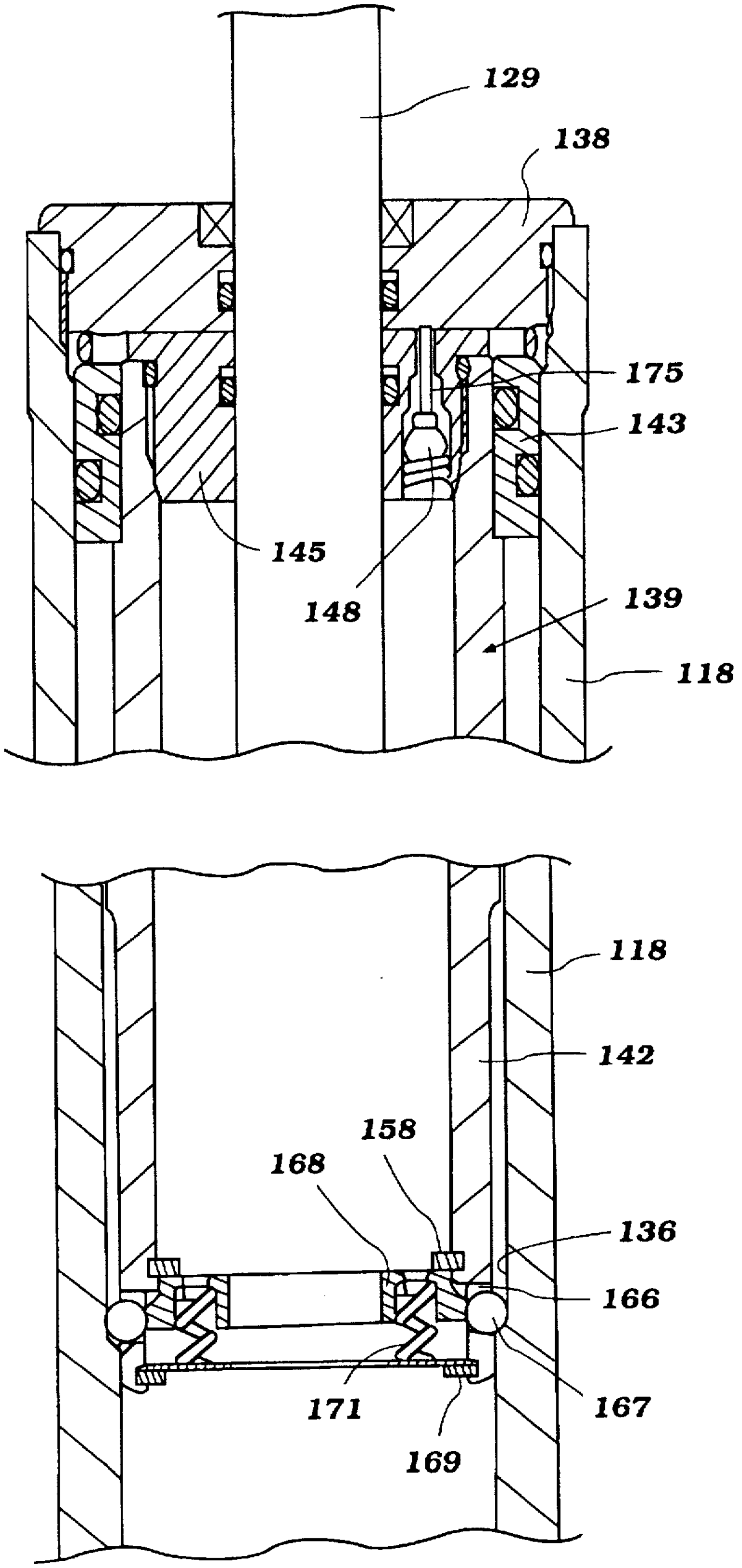
FIG. 10 is a broken cross sectional view, in part similar to FIG. 4 and shows the fluid motor in its fully tilted up position.

A latching mechanism, indicated generally by the reference numeral 164 and shown in most detail in the right hand side of FIG. 4 and the lower portion of FIG. 10, is provided at the lower end of the trim cylinder 139 for latching the trim cylinder in its fully trimmed up position for a reason to be noted. To this end, the lower ends of the trim cylinder 139 are provided with a number of circumferentially spaced elongated slots which terminate at their upper ends in shoulders 166. Detent locking balls 167 are received within each of these slots 165 and are normally biased radially outwardly by a biasing plate 168. The biasing plate 168 is caged within the lower end of the trim cylinder 139 by means of a snap ring 169 received within a groove therein.

The biasing plate 168 is provided with a number of axially extending bores 171 that receive coil compressing springs 172 that are engaged with the snap ring 169 and normally urge the biasing plate 168 upwardly and the detent balls 167 outwardly. Their latching function cooperates with the lower end of the bore portion 136 of the outer cylinder 125, as will be described shortly by reference to FIGS. 5–10.

A fluid chamber 173 is formed by the outer cylinder bore 135 below the trim piston 139 and which can communicate with the underside of the floating piston 156 through the opening in the retaining ring 169. It has been noted that there is provided the position responsive valve 148 in the end closure and gland 145 which communicates the chamber 146 with the chamber 155. The valve 148 controls the flow through a passage 174 that is formed in the gland 145. This valve includes a projecting portion 175 that will contact the enclosure 138 when the trim cylinder 139 is in its fully trimmed up condition as seen best in FIG. 10.

The operation of the unit 104 and specifically the hydraulic fluid motor portion 115 thereof will now be described by reference to FIGS. 5–10 .

Figure 5:
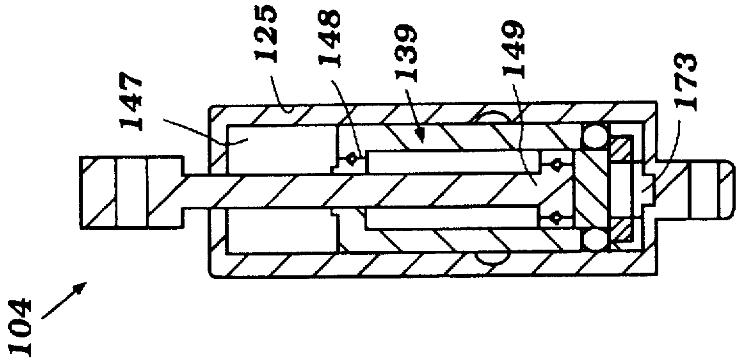

FIG. 5 shows the fully trimmed down condition which corresponds to the solid line view of FIG. 1. If it is desired to trim the outboard motor 101 up through the range A, as shown in FIG. 1, the system is pressurized so as to introduce fluid under pressure to the chamber 173 beneath the trim cylinder 139 and vent the upper chamber 147 back to the return side of the pump. Since the piston rod 129 extends through the chamber 147, more fluid will be required to cause trim-up movement than is displaced from the chamber 147, and this made-up fluid is made up from the reservoir 119. Since the pick up tube 121 does not go to the bottom of the reservoir 119, foreign matter will not be picked up and delivered to the interior of the fluid motor 115, as has already been noted.

When the chamber 173 is pressurized, the pressure will act on the floating piston 156 and urge it upwardly along with the trim cylinder 141. Since the seal between the trim cylinder is disposed on the sealing ring 143, a large diameter effective area is provided. That is, the effective area of the trim cylinder 139 is not the area displaced by either the cylindrical portions 141 or 142, but actually the area of the ring 143. This does not appear in FIGS. 5–7, but is evident from FIG. 4.

This upward movement can continue throughout the trim range A until the trim cylinder 139 reaches its uppermost position. At the time that this happens, the detent balls 167, which have been engaged with the cylinder bore 135, will move into the area of the cylinder bore 136. The balls 167 will not be moved to their engaged position at this time, however, since the ring 165 will still be retained in position by a projecting portion of the floating piston 156, as shown in FIG. 4, and hence the balls are shown retracted in FIG. 7. That is, the locking of the trim cylinder 139 in position does not occur immediately when the trim cylinder 139 moves to the position at the end of the trim-up adjustment.

Once the outboard motor 101 has been fully trimmed up to the end of its range, as shown in the lower phantom line view of FIG. 1, if the operator desires to achieve tilt up, then the chamber 173 is again pressurized or is continued to be pressurized. When this occurs, the floating piston 156 will be urged upwardly away from the snap ring 158 (FIG. 4). When this occurs, the springs 172 can expand and move the plate 168 upwardly so as to urge the detent balls 167 outwardly into engagement with the larger diameter bore portion 136, which is depicted in FIGS. 5–9 as a detent recess. Although it is possible to form this as merely a detent recess, for machining simplicity the portion 136 actually is a larger diameter bore, as shown accurately in FIGS. 4 and 10 and only schematically in FIGS. 5–9.

The floating piston 156 and piston 149 may then move upwardly because the position responsive valve 148 will have been opened by the contact of the projection 175 with the enclosure 138, and fluid may then be displaced from the chamber 155 to the chamber 137 and out the return conduit aforedescribed. This movement can continue until the fully tilted up position, as shown in FIGS. 1 7–9 and 10. In this position, the detent balls 167 will act to lock the trim cylinder 139 against downward movement, even if there is no fluid pressure existent in the chamber 173. Thus, the system cannot float downwardly due to the locking of the trim cylinder in position.

Figure 9:
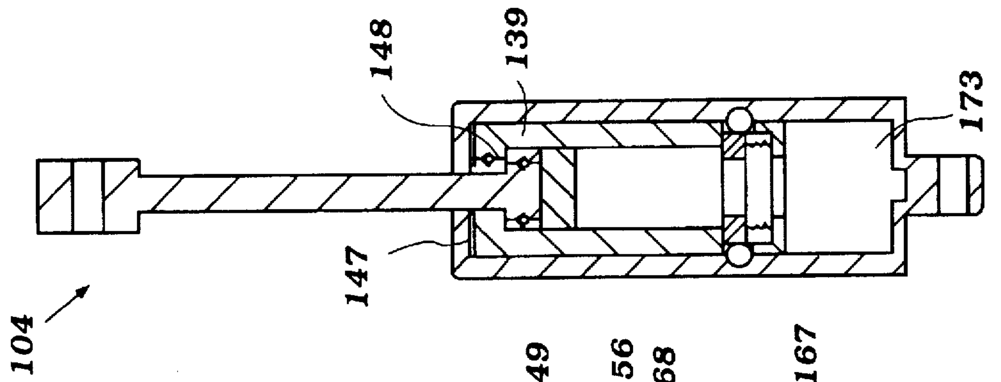
FIGS. 5–9 are views showing the embodiment of the invention in the fully trimmed down condition through movement to the fully trimmed up, tilted up condition.
Figure 8:
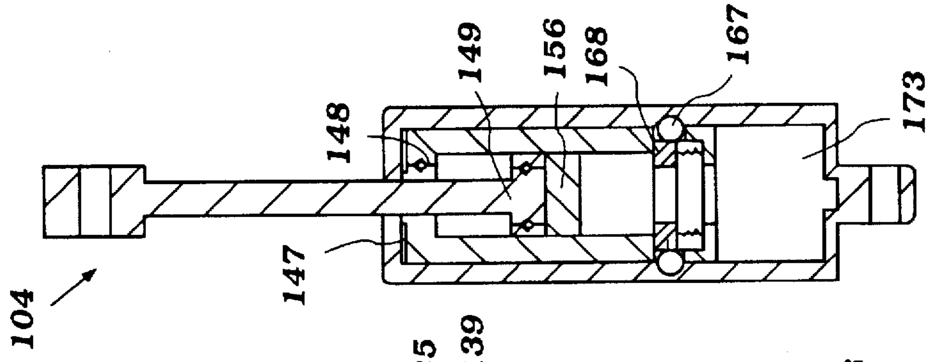
Figure 7:
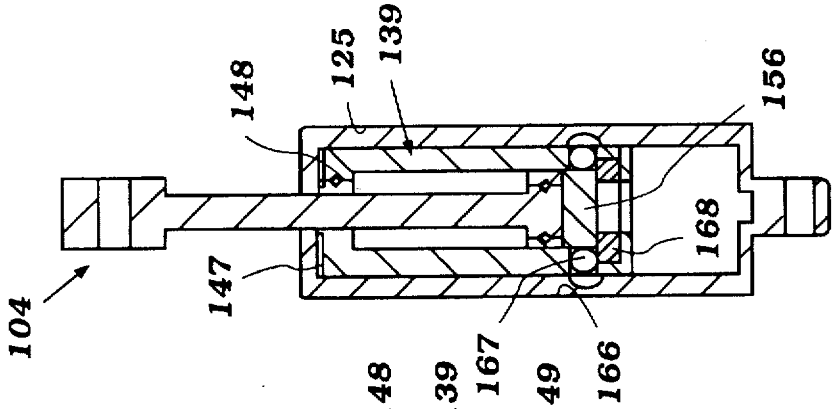
Figure 6:
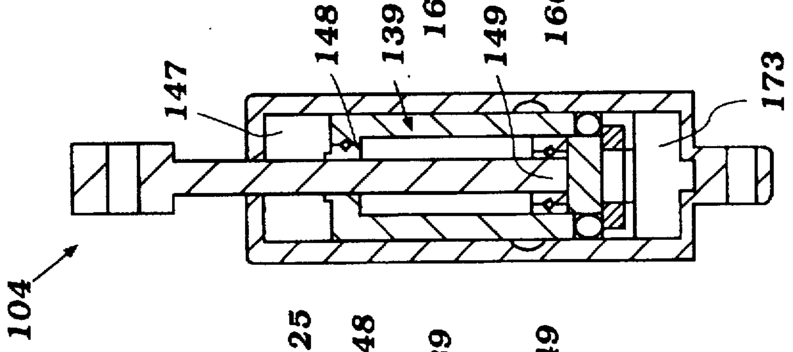

When it is desired to effect tilt down, the chamber 147 is pressurized, and this will cause the piston 149 and floating piston 156 to move downwardly from the position shown in FIG. 9 to the position shown in FIG. 8 and finally to the position shown in FIG. 7. When the position of FIG. 7 is reached, the plate 168 will be moved downwardly and the floating piston 156 will effect this movement, compressing the springs 172. Thus, the detent balls 167 may be cammed out of engagement with the bore portion 136 to move into the smaller diameter bore 135 so as to adjust the trim position as desired.

Figure 11:
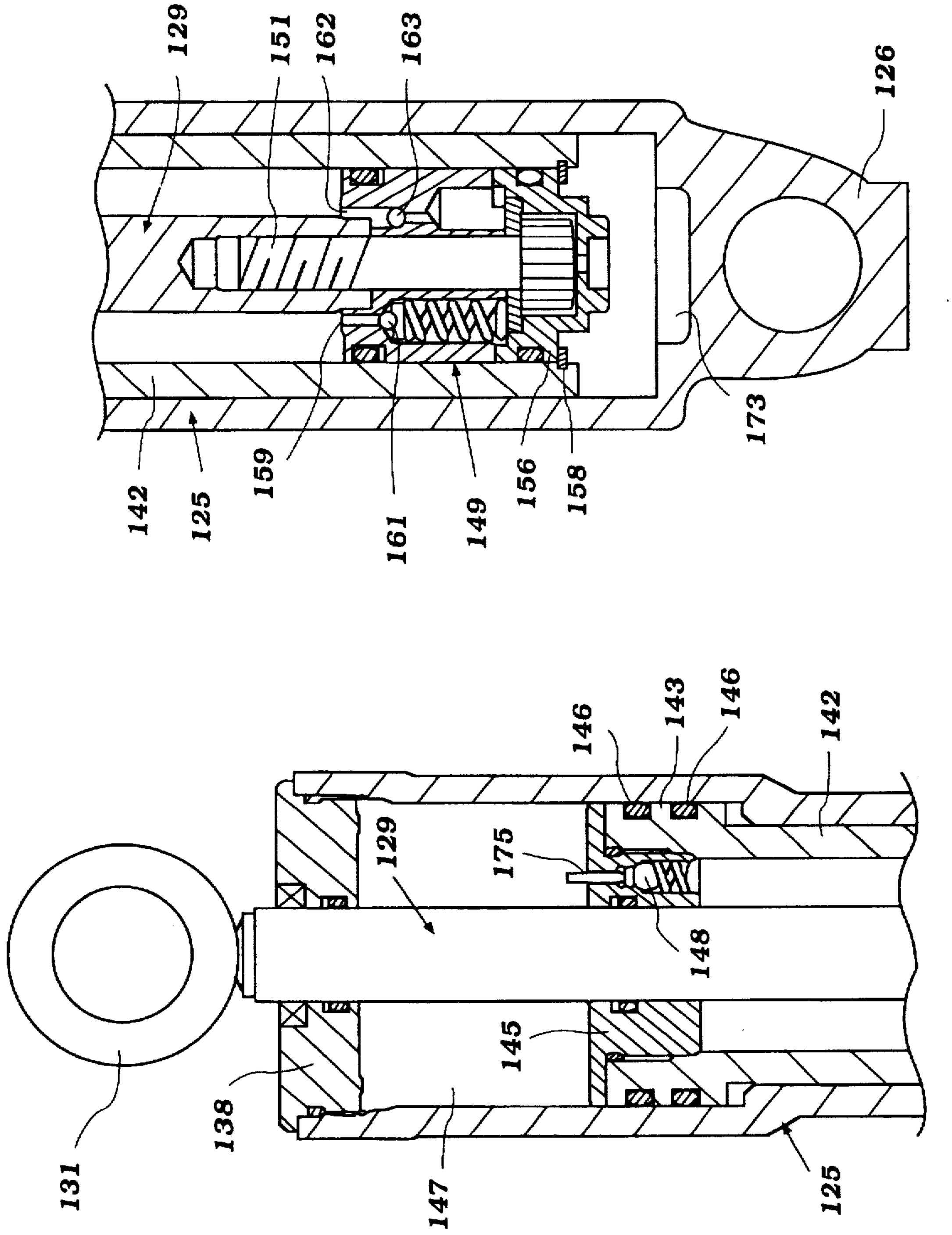
FIG. 11 is a broken cross sectional view, in part similar to FIG. 10 and shows another embodiment of the invention.

Although the invention as thus far described has been employed in connection with a fluid motor having a piston locking mechanism, it can also be used with other types of fluid motors. FIG. 11 shows a more conventional type of trim and tilt mechanism. Since the basic construction is the same components having like construction and function have been identified by the same reference numerals already described. It is believed that those skilled in the art will understand the construction and operation of this embodiment without further description.

From the foregoing description, it should be readily apparent that the described constructions can permit a very compact hydraulic tilt mechanism for a marine outboard drive and, nevertheless, one in which any contaminants which may enter the hydraulic fluid can settle at the bottom of the reservoir and will not be picked up by the pump and circulated to the fluid motor where its operation may be adversely affected. Of course, those skilled in the art will readily understand that the foregoing description is that of preferred embodiments of the invention, and various changes and modifications may be made without departing from the spirit and scope of the invention, as defined by the appended claims.

What is claimed is:

1. A hydraulic tilt mechanism for a marine outboard drive comprised of a hydraulic motor having a cylinder adapted to be affixed to one member of the outboard drive, said cylinder defining a cylinder bore, a trim cylinder is received and slidably supported within said cylinder bore and defining a second cylinder bore, a piston reciprocating in said second cylinder bore and defining at least one fluid chamber therewith, a piston rod affixed to said piston and extending through one end of said cylinder for connection to another member of the outboard drive for effecting relative movement of the members upon pressurization of said fluid chamber, pressurization of said fluid chamber effecting reciprocal movement of said trim cylinder and said piston for effecting trim adjustment of the outboard drive and for effecting relative movement of said piston to said trim cylinder for effecting tilt up movement of the outboard drive, said cylinder bore being defined by a blind bore extending through said cylinder and closed at one end by an end closure through which said piston rod extends, and means for providing a seal between the end of said trim cylinder disposed adjacent said end closure and said cylinder bore, said piston rod extending through an open end of said trim cylinder, a seal disposed between said open end of said trim cylinder and said piston rod, said cylinder bore of said cylinder being comprised of a first larger diameter portion wherein said means for sealing the one end of said trim cylinder to said bore is positioned, a second smaller diameter portion through which the majority of the length of said tilt cylinder extends, and a third smallest diameter portion adjacent said blind end of said cylinder bore into which said tilt cylinder extends in some positions of said outboard drive, a fluid reservoir disposed at said one side of said cylinder and entirely below a fluid pump for supplying fluid to said fluid pump for said motor operation, and a pick-up tube depending from said fluid pump into said fluid reservoir and terminating above the lower end thereof for permitting contaminants to accumulate at a lower end of the fluid reservoir and not be circulated by the fluid pump.

2. A hydraulic tilt mechanism as set forth in claim 1, further including a position responsive valve in the closure at the end of the tilt cylinder for providing communication between an upper portion of the cylinder bore and the area of the tilt cylinder between its end closure and the piston when the trim cylinder is in its fully trimmed up position.

3. A hydraulic tilt mechanism as set forth in claim 2, wherein the piston is provided with a shock absorber valve for permitting flow from one side of said tilt piston to the other side of said piston when an underwater obstacle is struck and a return valve for permitting flow in the opposite direction once the underwater obstacle is cleared.

4. A hydraulic tilt mechanism as set forth in claim 3, further including releasable latch means for retaining the trim cylinder in its fully trimmed up position.

5. A hydraulic tilt mechanism as set forth in claim 4, wherein the releasable latch means operates upon a shoulder formed between the smallest diameter portion of the cylinder bore and the next smallest diameter portion.

6. A hydraulic tilt mechanism as set forth in claim 5, wherein the latch means comprises a plurality of detent balls urged radially outwardly by a latching member.

7. A hydraulic tilt mechanism as set forth in claim 6, wherein the floating piston has a portion that retains the latching member in an unlatched position until the floating piston is actuated for effecting tilt-up movement of the outboard drive.

* * * * *